United States Patent [19]
Mitchell et al.

[11] Patent Number: 6,162,284
[45] Date of Patent: Dec. 19, 2000

[54] SEPARATOR FOR GASES, LIQUIDS AND SOLIDS FROM A WELL

[75] Inventors: Bryce Mitchell, Edmonton; David Gladue, Stoney Plain; Keith Corb, Calgary, all of Canada

[73] Assignee: Dailey Canada Limited, Calgary, Canada

[21] Appl. No.: 09/217,897

[22] Filed: Dec. 22, 1998

[30] Foreign Application Priority Data

Jan. 9, 1998 [CA] Canada .................................. 2,226,638

[51] Int. Cl.⁷ .................................................. B01D 19/00
[52] U.S. Cl. .............................. 95/261; 95/152; 95/269; 96/195
[58] Field of Search ........................... 95/152, 261, 269; 96/195, 196; 166/312; 210/732, 733, 747; 55/385.1

[56] References Cited

U.S. PATENT DOCUMENTS

| | | |
|---|---|---|
| 3,973,930 | 8/1976 | Burgess ...................................... 95/261 |
| 4,088,457 | 5/1978 | Phillips et al. .............................. 96/196 |
| 4,100,982 | 7/1978 | Wilkinson et al. . |
| 4,187,087 | 2/1980 | Whitescarver ............................. 96/195 |
| 4,247,312 | 1/1981 | Thakur et al. . |
| 4,324,557 | 4/1982 | Wegstedt ................................... 95/261 |
| 4,434,861 | 3/1984 | Howeth . |
| 4,515,607 | 5/1985 | Wolde-Michael . |
| 4,521,232 | 6/1985 | Howeth . |
| 4,595,422 | 6/1986 | Hill et al. . |
| 4,670,139 | 6/1987 | Spruiell et al. . |
| 4,790,355 | 12/1988 | Kennedy .................................... 95/261 |
| 4,911,834 | 3/1990 | Murphy . |
| 5,010,966 | 4/1991 | Stokley et al. . |
| 5,090,498 | 2/1992 | Hamill . |
| 5,132,025 | 7/1992 | Hays . |
| 5,344,570 | 9/1994 | McLachlan et al. . |
| 5,415,776 | 5/1995 | Homan . |
| 5,439,058 | 8/1995 | Malbrel et al. .......................... 166/312 |
| 5,458,198 | 10/1995 | Hashemi et al. ........................ 166/312 |
| 5,570,749 | 11/1996 | Reed . |
| 5,718,298 | 2/1998 | Rusnak . |
| 5,775,442 | 7/1998 | Speed ....................................... 95/269 |

FOREIGN PATENT DOCUMENTS

| | | |
|---|---|---|
| 1121003 | 1/1962 | Germany . |
| 2153249 | 8/1985 | United Kingdom . |

OTHER PUBLICATIONS

Jerry A. Rusnak, "A Closed Circulating System for Air Drilling", 1998, IADC/SPE p. 107–111.

S.O. Hutchinson and G.W. Anderson, "What to consider when selecting drilling fluids", 1974 World Oil, A Gulf Publishing Company Publication.

*Primary Examiner*—Duane Smith
*Assistant Examiner*—Minh-Chau T. Pham
*Attorney, Agent, or Firm*—Bereskin & Parr

[57] ABSTRACT

The invention relates to an apparatus and method for use in well drilling, for separating rock cuttings, gas, water, drilling mud, gases, or foam which may be part of the drilling fluid returning from a bore hole. The apparatus has a plurality of compartments through which the drilling fluid flows. The first compartment makes use of a degasser to extract gases from the fluid, as well as break down foam. Subsequent chambers involve the use of shale shakers, centrifuges, and flocculants to aid in the separation of liquids from solids. The invention also employs a deduster unit which eliminates the spread of dust common in air drilling operations. Through the use of these various devices, the invention eliminates the need for venting the drilling fluid to the environment surrounding the well site.

34 Claims, 9 Drawing Sheets

SEPARATOR FOR GASES, LIQUIDS AND SOLIDS FROM A WELL

FIELD OF THE INVENTION

The present invention is a separator for use in well drilling, for separating rock cuttings, gas and water which are to be removed from the bore hole. The flow from the bore hole may also contain drilling mud, gases or foam. The present invention is more particularly intended to separate these materials and clean them to meet environmental micro toxicity limits.

BACKGROUND OF THE INVENTION

In surface drilling, the drill bit at one end of a drill stem is rotated and used to bore into the earth. The drill stem and extensions referred to as the "drill string" are typically hollow. During drilling, gas or fluid is pumped down through the drill stem, the gas or fluid then rises to the surface through the annular space between the drill stem and the wall of the hole bored by the drill stem. The hole bored by the drill stem is referred to as the "bore hole". The gas or fluid may comprise air, nitrogen, water, foam, drilling mud, or any other substance that is capable of removing cuttings from the bottom of the bore hole to the surface of the well. For example, in a conventional drilling rig, drilling mud is used to cool the drill bit and remove cuttings from the bottom of the drill hole, by carrying them to the surface in the annular space between the drill string and the bore hole wall. Traditionally the drilling mud coming from the well bore was dumped into a reserve pit. The drilling mud would then be allowed to settle so that sediments fell to the bottom of the pit. The drilling mud could then be pumped from the top of the pit back into the well bore. However, because of ever increasing environmental concerns many governments have banned the use of in-ground reserve pits. Similarly, in the case of pure air drilling the cuttings and dust returning from the bore hole would be allowed to dissipate in the environment, creating a dust cloud that could extend several kilometers and this is no longer environmentally acceptable.

Today, in place of in-ground reserve pits, tanks are used. The drilling fluid is slowly circulated through the tanks to allow gases to dissipate and solids to settle out. Recent drilling mud circulation systems have used a vibrating screen assembly known as a "shale shaker" to separate out the bulk of the cuttings which drop from the shaker onto the ground or into a pit. Other methods of separation include centrifuge separators to remove the solids while retrieving the substantial portion of the fluid. Once passed the initial separation stage the fluid then enters one or more rectangular open topped "mud tanks". The fluid slowly moves through the mud tank and most of the fine solids which remain suspended after screening or centrifuging settle out. Often the mud tank has one or more transverse weirs or baffles, which divide the tank chamber into compartments. The weir functions to trap settling fine solids and thick mud, allowing "cleaned" mud to advance and to provide tanks with mud at different concentrations. The cleaned mud is then recycled to the well bore.

Such systems work well with relatively liquid drilling fluids. However, in air or combined air and foam drilling systems these separation units are not terribly efficient as the "drilling mud" contains more air and foam than it does fluid or mud. Further, being less dense than conventional drilling mud the output from the bore hole is at considerably higher velocity, which can cause failures in conventional filtration systems.

U.S. Pat. No. 5,718,298 discloses a separation system for use with wells drilled using air or mist as the drilling fluid. The invention as disclosed contains a longitudinal separator tube through which drilling fluid from a blooie line passes. The longitudinal tube contains plurality of openings into which water may be injected as well as a plurality of dump gates through which drilling materials drop into a large receiving tank. A series of angle baffles are utilized within the separator tube to reduce the velocity of the exhaust from the blooie line. When drilling with dense fluids or in the case of large drill cuttings, the separator tube and its associated outlet ports may rapidly become plugged. Should the injection of water into the separator tube be unable to clear any obstructions, then it may be quite difficult to clear out the separator tube.

Thus, there is a need for a drilling fluid separator that is able to separate efficiently and cleanly drill cuttings from a gas, water and foam drilling fluid.

BRIEF SUMMARY OF THE INVENTION

The present invention provides both a method of and an apparatus for separating gases, fluids and solids exiting from a well, for example an oil well, during drilling of the well. More particularly, the invention is concerned with so-called "air drilling", where a high velocity flow of air is used to entrain well bore cuttings. In such systems, a certain amount of liquid is often introduced as a foam, which has a number of advantages. Nonetheless, the essential intention is to keep the volume of liquids in the flow down into and back from the well to a minimum.

To ensure adequate removal of cuttings, and bearing in mind the lower density of gases, high velocities and flow rates have to be used. In turn, where foam is used, this means that large volumes of foam are vented from the well. Frequently, this presents a significant disposal problem.

Accordingly, the present invention provides a method and apparatus intended to, sequentially;

break down the foam, to separate gases from the liquids;
separately vent the gases and pass the liquids and entrained solids on for further processing;
separate the solids from the liquids, preferably by way of a shale shaker and a centrifuge;
as required, chemically treat the liquid to promote flocculation of smaller particles, to enable their separation from the liquid;
re-use recovered liquid, or after checking to meet local toxicity requirements, dispose of liquid as permitted by local regulations.

For this purpose, the present invention provides an apparatus including a first chamber with a device for breaking down the foam and separating the gases and liquids. This is preferably in the form of a vortex tube cluster, which generates centrifugal forces sufficiently to break down the foam. The gas then exits from the top and the liquids and solids from the bottom. The liquids are then withdrawn and passed through a shale shaker, where larger cuttings or shale are separated. The liquids and finer particles then drop down into a second compartment. From the second compartment, liquids and fines are withdrawn and separated in a centrifuge. The cleaner liquid from the centrifuge is passed to a third compartment and the fines rejected. In a fourth compartment, a flocculation agent resides, which can be circulated through the centrifuge as required to cause flocculation of any remaining fines.

In accordance with the first aspect of the present invention, there is provided a separator, for separating a flow of material from a blooie line exiting from a well bore, the separator comprising:

a first compartment for receiving liquid; and a centrifugal means for imparting centrifugal forces to the flow of material to promote separation of gases from liquids and solids, said centrifugal means comprising: an inlet for connection to the blooie line in use; an upper housing; a tube extending generally vertically down from the upper housing; a first outlet for gas and provided in the upper housing; a second outlet for liquids and solids and provided at the lower end of the vertical tube, the second outlet discharging into the first compartment, wherein the vertical tube extends down into the compartment so that, in use, a liquid level can be maintained in the first compartment that prevents flow of gas down through the second outlet, whereby the flow of material, including gas, liquids and solids, enters the centrifugal means through the inlet and is subject to centrifugal forces, causing the gas to be separated from the liquids and solids, the gas exiting through the first outlet, and the liquids and solids only exiting through the second outlet to the first compartment, for separation.

In accordance to the second aspect of the present invention, there is provided a method of separating a material flow from a blooie line connected to a well head, the method comprising the steps of:

(1) passing the material flow into a centrifugal means whereby centrifugal forces effect separation of gas from liquids and solids;

(2) causing gases to exit through a first port from the centrifugal means; and (3) causing liquids and entrained solids to exit from a second port from the centrifugal means. (4) locating the second port in a compartment filled with liquid and maintaining the second port below the level of the liquid in the compartment;

(5) separately effecting separation of the liquid form the solids.

BRIEF DESCRIPTION OF THE DRAWINGS

For a better understanding of the present invention, and to show more clearly how it may be carried into effect, reference will now be made, by way of example, to the accompanying drawings which show a preferred embodiment of the present invention and in which.

DETAILED DESCRIPTION OF PREFERRED EMBODIMENTS

Figure 1:
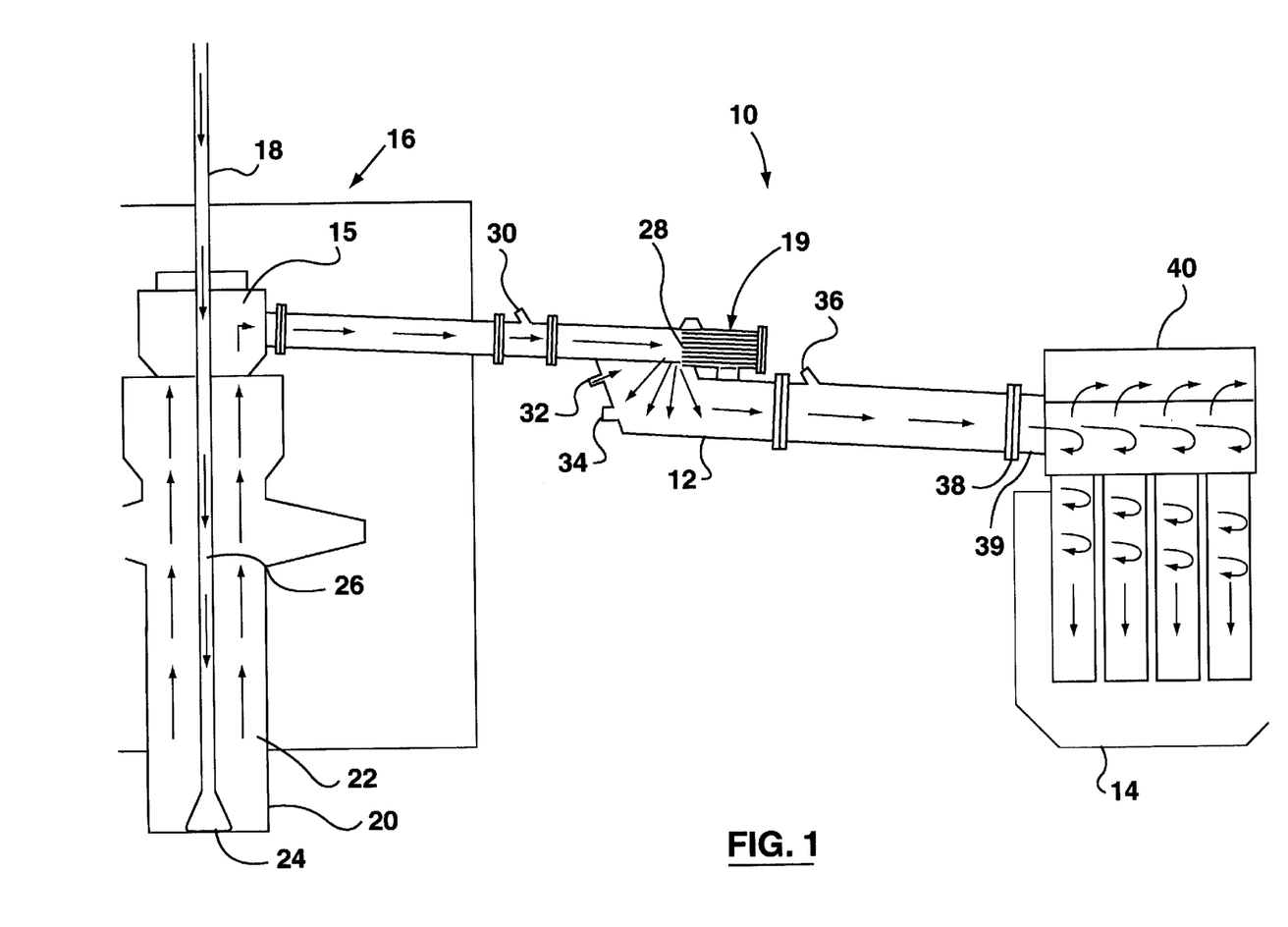
FIG. 1 is a schematic illustrating the well bore, the separator, and a line connecting the well bore to the separator.

Referring first to FIG. 1, a schematic view of the preferred embodiment of the apparatus is shown generally as 10. The principal components of the apparatus consist of a line 12 and a separator 14. The line 12 connects the well head 15 at the drilling rig, (shown generally as 16), to the separator 14. The line 12 is commonly known as a "blooie" line and is designated as such in this specification, including the claims. The drilling rig 16 contains a rotatable drill string 18 which extends into the well bore 20 from the well head 15. At the end of the drill string 18 in the well bore 20 is mounted a drill bit 24. Drilling fluid 26 is pumped through the drill string 18 and out of the bottom of the drill bit 24. "Drilling fluid" may comprise air, gases, foam, water, oils, drilling mud or a mixture of different fluids. The drilling fluid 26 then returns to the surface through the annular space 22 between the drill string 18 and the well bore 20. The drilling fluid 26 then exits the drilling rig 16 through the blooie line 12, ultimately entering the separator 14. The blooie line 12 contains an impact device, commonly referred to as a "dead head" 19 which includes a plurality of impact plates 28. The exposed face or end of each impact plate 28 is hardened by welding a bead of suitable hard steel alloy or by using other known hardening means to prevent wear of the plates 28.

As is detailed below, the function of the dead head 19 is to absorb the momentum and energy from a high velocity gas stream and in particular, the momentum of solid particles. For this purpose, the line 12 can expand at the dead head 19 to have a larger diameter downstream. This in turn gives a lower downstream velocity. Upstream from the dead head 19, there is a deduster 30. The deduster 30 is a short length of pipe with an annular chamber around it, provided with a port for connection to a water supply. Inside the deduster 30, there are a series of inlet ports or holes, causing water to be sprayed radially into the gas flow. This serves to wet dust and other solid particles, promoting later separation of solids from the gas flow. For air drilling, approximately one cubic meter of water per minute is injected into deduster 30. For foam applications, three cubic meters per minute would be injected. Alternatively, steam could be injected upstream of a degasser 40 in the separator 14. As with the injection of water, steam has a dampening affect and it reduces the possibilities of explosions. Additionally, nitrogen could be injected with steam or water to reduce explosion risk.

The blooie line 12 also contains intake ports 32 and 36. The purpose of these intake ports is to inject water into the blooie line as detailed below. In the case of pure air drilling, water injected at intake port 32 serves to add liquid to the incoming dust, which aids in reducing the wear to the impact plates 28, and liquifies the drilling fluid 26 before it enters the separator 14. Without the use of the intake port 32 and deduster 30, dust carry over in the gas from the Vortex Cluster will occur, i.e. dust will not be absorbed by water in the separator, but will be vented from the separator with the gas flow. In the case of foam drilling, the water serves to saturate the foam with water, so that the additional mass and density breaks down the foam when it enters the Vortex Cluster. Intake port 34 is an air bypass inlet, used to divert air away from the drill pipe when a drill pipe connection is made while drilling.

Figure 2:
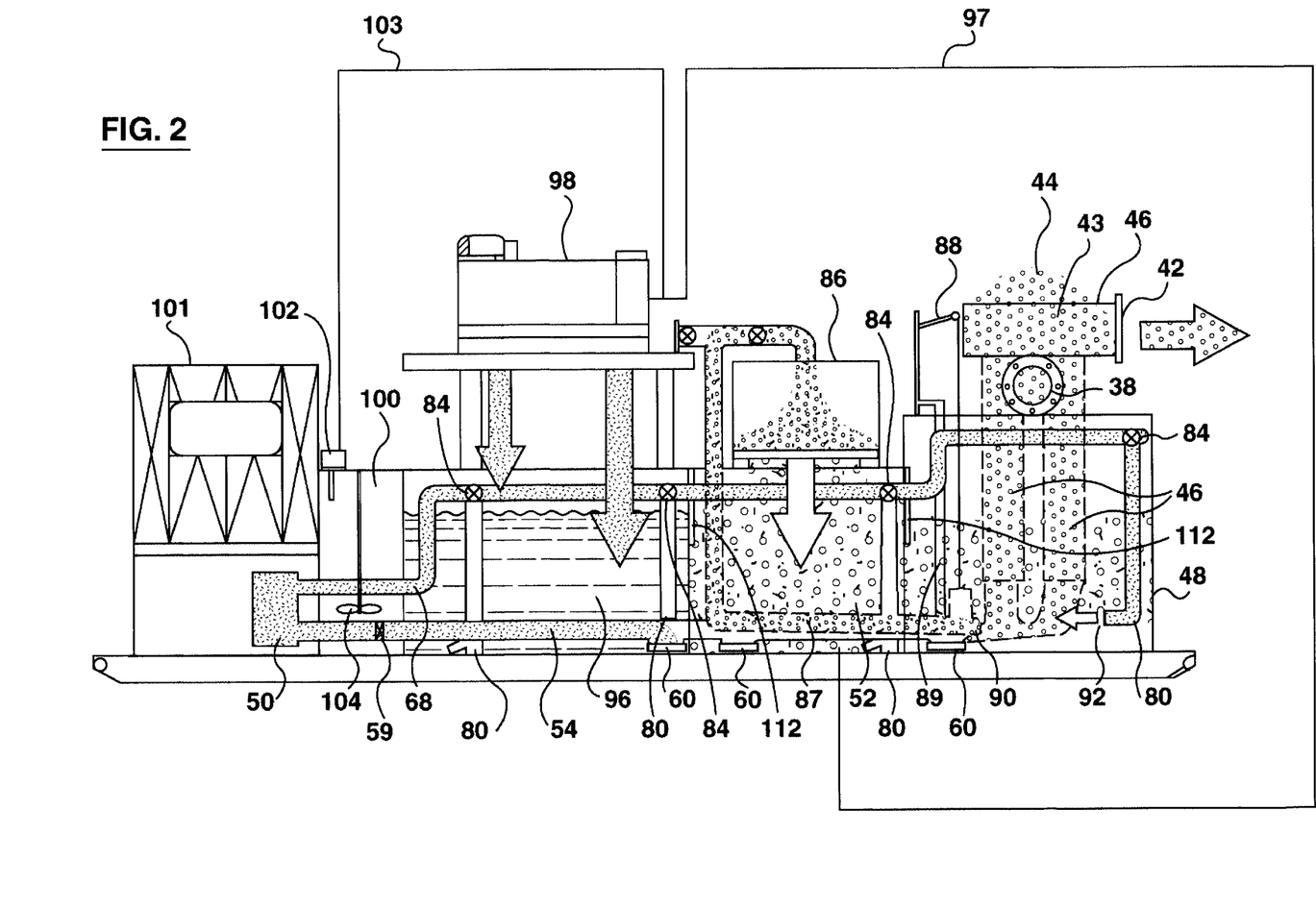
FIG. 2 is a side view of the separator.
Figure 7:
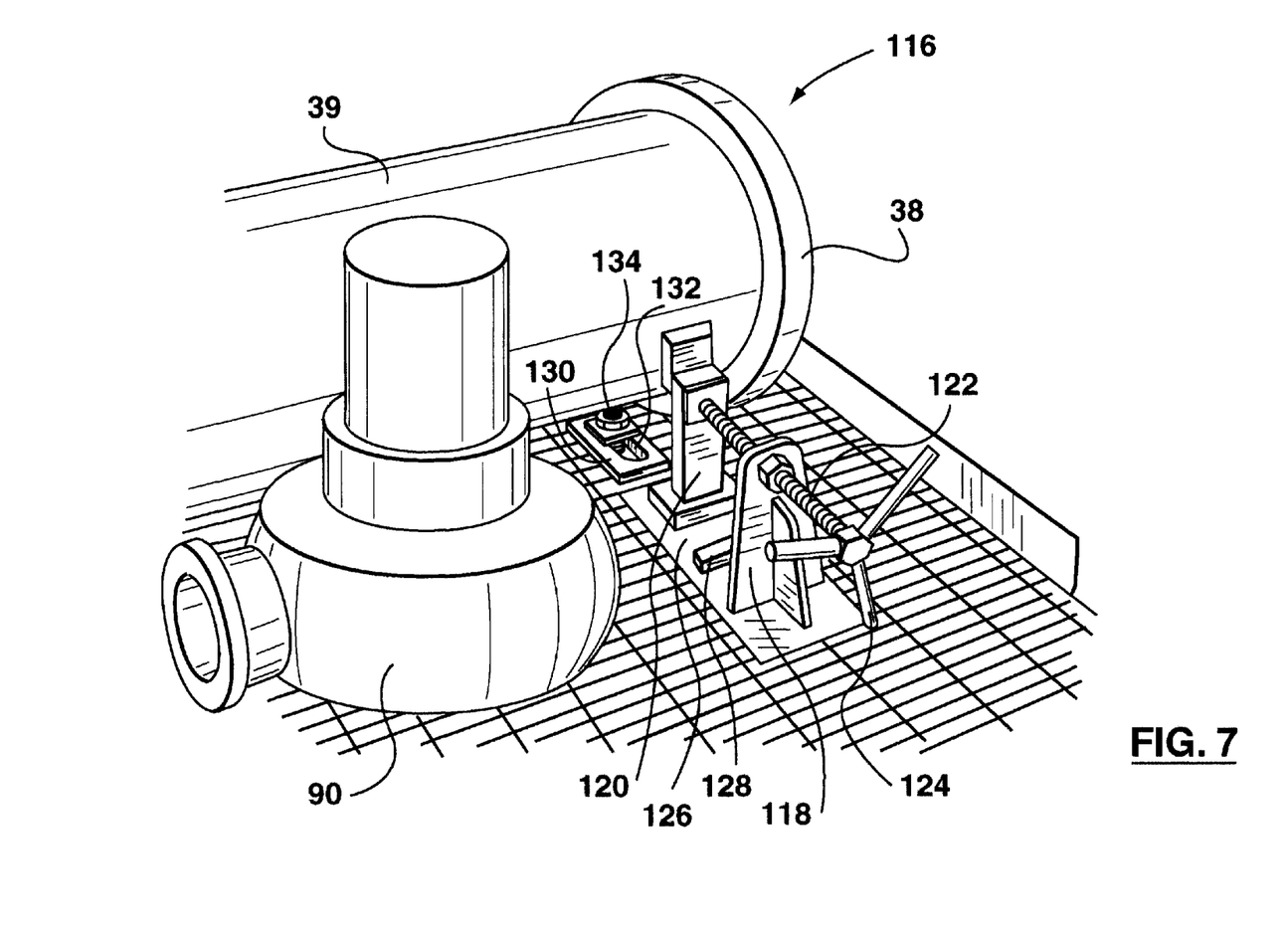
FIG. 7 is a perspective view of an mechanism to aid in the alignment of a degasser with the line connecting the well bore to the separator.
Figure 8:
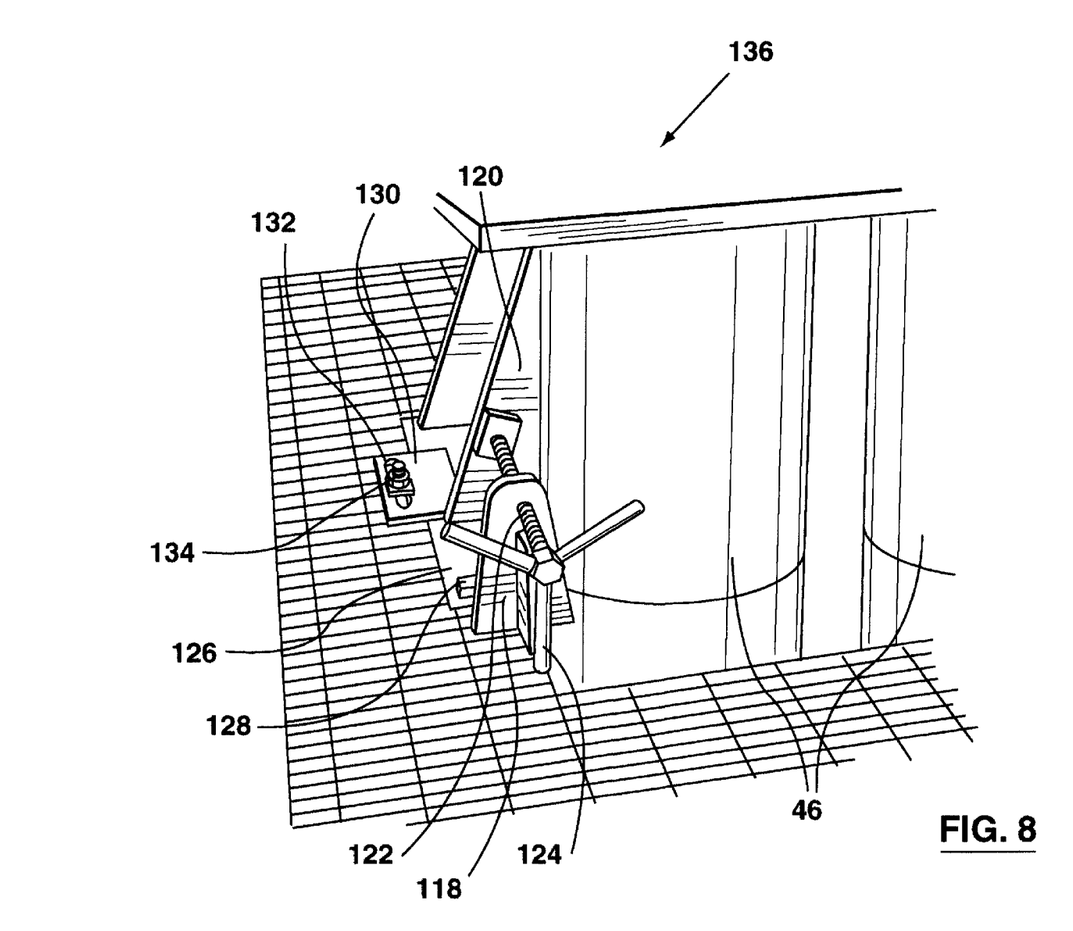
FIG. 8 is a perspective view of posterior alignment mechanism designed to function in cooperation with the anterior alignment mechanism of FIG. 7.

Referring now to FIG. 2, which is a side view of the separator 14. The separator 14 comprises a series of compartments through which the drilling fluid 26 is circulated and filtered. A first compartment 48, a second compartment 52 and a third compartment 96 have connecting gates 112 which when opened allow fluid to flow between the upper levels of the compartments. The degasser 40 is mounted above and extends into the first compartment so as to be adjustable (FIG. 7 and FIG. 8). The degasser 40 separates the gases in the drilling fluid from the solids and liquids. The degasser 40 in this embodiment is a Vortex Cluster separator manufactured by Porta-Test International Inc. Essentially this device imparts a strong swirl component to the fluid flow, creating high G forces which promote separation of gases from the liquids and solids, and also tending to break down any foam. The gases are vented upwardly and out to a flare pit in known manner (not shown) through a flare pit exit 42.

The degasser 40 has an upper housing 43. The upper housing 43 has a top which has been modified in the preferred embodiment from a flat top to a circular dome 44. It was found, that when flaring off gas, pressure would build in the housing 43, and pressure surges could arise, causing the original flat top to momentarily lift. The dome 44 is able to handle the pressure without lifting.

The solids and liquids flow down a set of drop tubes 46 and fall to the bottom of the first compartment 48. The number of drop tubes 46 descending from the degasser 40 is dependant upon the flow rate. For foam, four tubes is adequate to maintain a good velocity for the foam. The degasser 40 as provided by the manufacturer originally had plates at the bottom of the drop tubes 46. The plates were intended to limit the vertical extent of the air vortex or cone, and prevent it from extending out of the bottom of the cluster. However, it was found that the plates could become clogged with large cuttings. The plates were subsequently removed, and it is a simple matter of monitoring flow conditions to ensure that gas does not extend out the bottom of the cluster. Another change to the degasser 40 was to place wear plates on the leading edges of the drop tubes 46, to prevent wear by the various solids.

Figure 3:
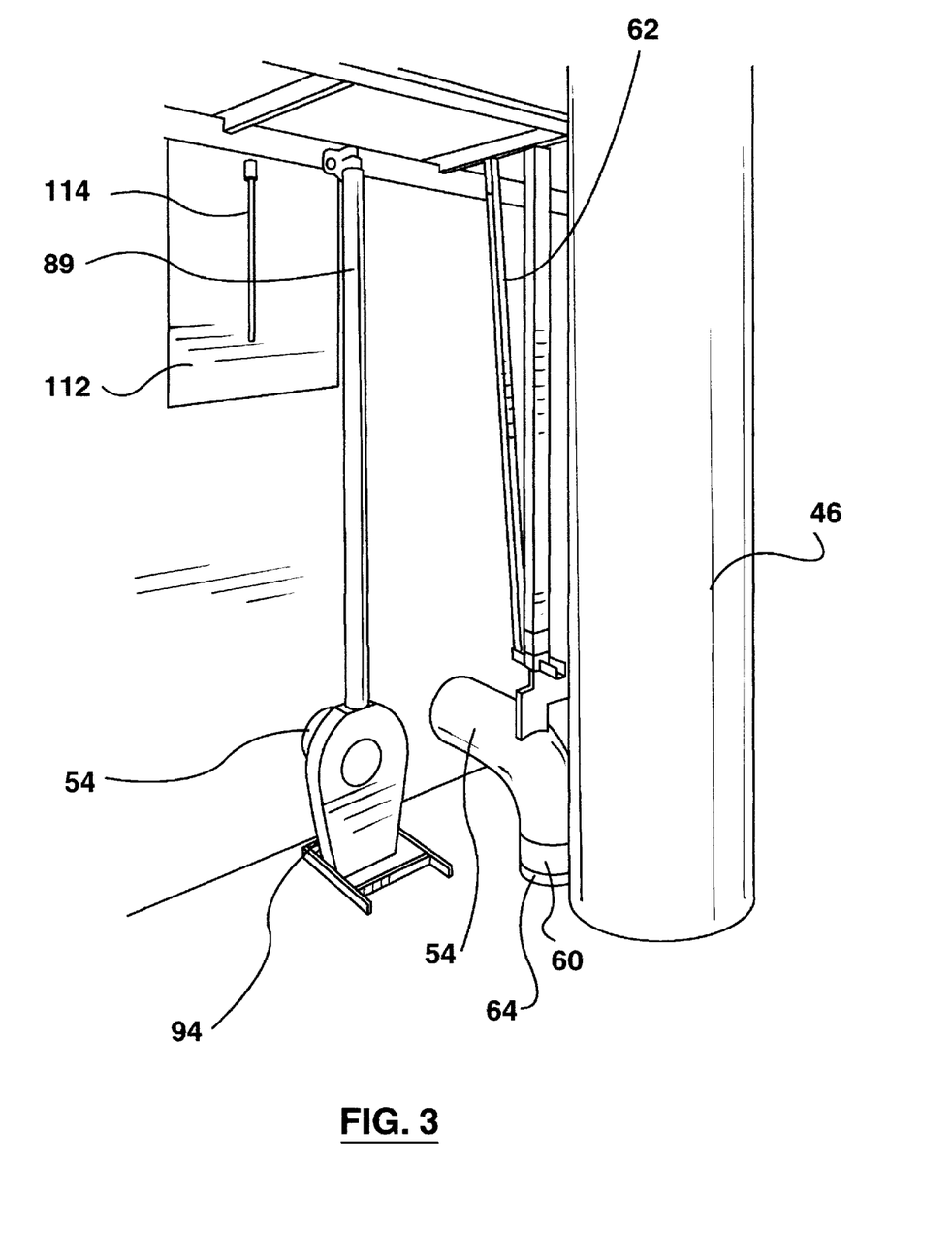
FIG. 3 is a perspective view of a portion of a first compartment of the separator.
Figure 4:
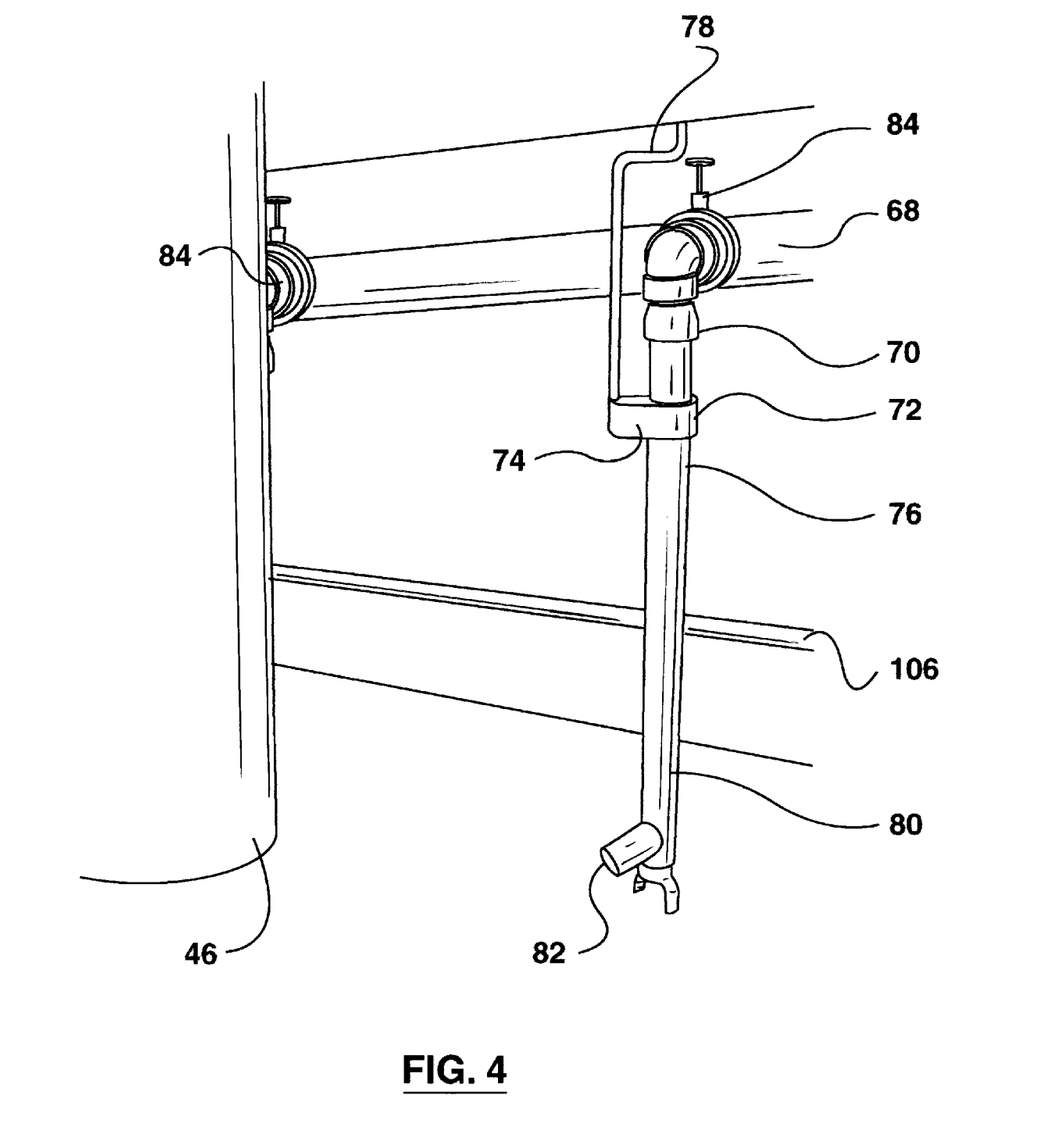
FIG. 4 is a perspective view of a mud gun within the first compartment.

A circulation pump 50 is situated exterior to the main compartments of the separator 14. Circulation pump 50 is connected to a suction line 54 which has a main valve 59 and three intake valves 60. Intake valves 60 may be closed or opened as desired to control the flow of fluid through the compartments of separator 14. In the preferred embodiment intake valves are controlled by a valve mechanism (see FIG. 3). Also connected to the circulation pump 50 is a discharge line 68 which has five mud guns 80 branching from the discharge line 68. Fluid from the discharge line 68 may be routed through any mud gun 80 by actuating the mud gun control valve 84 which regulates flow of fluid from discharge line 68 to mud gun 80. In the present embodiment the mud gun control valves 84 are mechanically actuated; however to one skilled in the art electrical actuation would be equally possible. As the sediments in a tank build up the operator will open the appropriate mud gun control valves 84 allowing the fluids cycled by circulation pump 50 to enter mud gun 80 thus agitating any settling debris. Mud guns 80 are rotatably mounted (as shown in FIG. 4) to discharge line 68 so that they may be directed throughout a compartment to stir up debris.

A shale shaker pump 90 resides at the base of the first compartment 48. The shale shaker pump 90 is well known in the art and is commonly referred to as an ABS pump, and is designed to handle liquid containing significant quantities of solids. In the preferred embodiment the ABS pump is provided with a hardened impeller. In experimentation it was found that a standard impeller lasted approximately 100 hours. A hardened impeller is expected to have three to four times that life. Two different techniques have been used for hardening the impeller, namely: a) hardening the surface of the impeller to one or two thousandths of an inch and then coating with a two thousandths of an inch hardening treatment or, b) treating the entire impeller so that it just penetrated throughout to harden it.

The cuttings and fluid are pumped from the base of first compartment 48 to a shale shaker 86 by the shale shaker pump 90 via the shale shaker input line 87 (shown as a dashed line). As the cuttings settle to the base of first compartment 48, inclined base 92 channels them toward the shale shaker pump 90. Should the deposits at the base of first compartment 48 no longer continue to adequately flow through shale shaker input line 87, mud gun 80 of first compartment 48 may be actuated to stir up the deposits, thus allowing them to be pumped through shale shaker input line 87. Shale shaker pump 90 is attached to a winch mechanism 88 which allows for efficient and rapid replacement of shale shaker pump 90 for service and maintenance. Shale shaker pump 90 engages shale shaker input line 87 by way of shale shaker pump connector 94 (FIG. 3).

The shale shaker input line 87 is connected to the top of the shale shaker 86 which resides above the second compartment 52. The shale shaker 86 in known manner, is configured to shake or move larger particles of rock until they fall into an exterior shale tank (not shown). As is known in the art, the shale shaker 86 functions as a sifting screen. The size of the mesh in the screen may be changed to allow for different size particles to pass through. The shale shaker 86 vibrates the screen and as the screen is positioned on an angle slightly above or below the horizontal, the larger solids that fail to pass through the screen work to the end of the vibrating screen and fall off into the exterior shale tank. In the preferred embodiment the drill cuttings separated by the shale shaker 86 to the external shale tank are of sufficient size to provide samples of use to geologists examining the geological structure of the site. In the case of air drilling the material exiting the well bore comprises about 50% drill cuttings and 50% dust, depending on formation. Since a large portion of the cuttings are very fine, and will pass through any screen, the use of a coarse screen, e.g. one with 210 or 250 mesh, will ensure that the large cuttings are separated. Flocculant (from a fourth compartment 100) may be added to the shale shaker 86, to aid in flocculation of smaller particles. Smaller particles may be charged, causing them to repel each other. The flocculant serves to eliminate the effect of the electric field and permits the particles to flocculate or coagulate. Liquids and fines (small particles) simply fall through the shale shaker 86 into the second compartment 52.

The shale shaker 86 can be replaced by a scalper or alternative device if there is a problem of foam being recreated. Due to its vibratory motion, the shale shaker 86 may recreate the foam that was broken up by the degasser 40.

Residing above a third compartment 96 is a centrifuge 98. The centrifuge 98 is of a type known in the art as a decanter centrifuge. The fines and liquid contained in the second compartment 52 are pumped through centrifuge input line 97 via an external pump (not shown) to the centrifuge 98. The fines and liquid pumped from second compartment 52 are mixed with a polymer flocculant agent pumped from the fourth compartment 100 via flocculant line 103, prior to their entry into the centrifuge 98. The purpose of the flocculant being to attract smaller particles to each other so that they may be extracted from the fluid by the centrifuge. Solids extracted by the centrifuge 98 are removed by an auger to the shale tank (not shown). Liquid and small fines from the centrifuge 98 are typically passed to the third compartment 96, but may be passed to any tank. The centrifuge could be provided with a hose to direct outlet fluids into any tank as desired, for example to bring up the level of a particular tank.

The fourth compartment 100 is the final compartment of the separator 14. The fourth compartment 100 is divided into two tanks. Each tank contains a polymer flocculant, a flocculant pump 102 and a flocculant agitator 104. The pumps 102 serve to pump the flocculant to the centrifuge 98 via flocculant line 103. While one tank is in use, the second is used to mix new polymers. When the first tank becomes empty the pump is switched to use the second tank which then becomes the flocculant source. The flocculant agitators 104 serve to mix flocculant with water, and the compartments 100 are provided with a device for adding concentrated flocculant. The flocculant causes ultra fines within the liquid, e.g. those particles of less than 50 microns in size, to coagulate. If necessary, a further external tank may be provided where the fluid as output from the centrifuge may be treated with carbon or other standard chemicals so that it will meet a micro toxicity test.

Adjacent to fourth compartment 100 is operator cabin 101 which contains electrical controls for pump control which provides shelter for an operator during winter operation.

Referring now to FIG. 3, a photograph of a portion of the first compartment 48 of the separator 14 is shown. One drop tube 46 from the degasser 40 is shown in the foreground. The end of the suction line 54 is shown with one intake valve 60 open. Intake valve 60 may be closed by the vertical movement of intake valve control arm 62 which lifts valve shutoff 64 to engage with the face of intake valve 60 resulting in the closing of intake valve 60. Shale shaker input line 87 and shale shaker pump connector 94 are shown without shale shaker pump 90. Shale shaker pump 90 is configured to be raised and lowered by winch mechanism 88 along pump guide rod 89. The shale shaker pump 90 and the shale shaker pump connector 94 each have flanges which engage each other when the shale shaker pump 90 is lowered by the winch mechanism 88 along pump guide rod 89 to mate with shale shaker pump connector 94.

One connecting gate 112 is shown in FIG. 3, and this connects the first compartment 48 to the second compartment 52. The gate 112 is shown in the closed position. By raising gate arm 114, connecting gate 112 is opened, thus allowing fluid to flow from first compartment 48 to second compartment 52. Connecting gates 112 between the other compartments are similarly configured.

FIG. 4 is a photograph of a mud gun 80 located within the first compartment 48 of the separator 14. The mud guns 80 are common in mud tanks and the like and their design can follow conventional practice. The mud gun 80 is rotatably connected to discharge line 68 by a rotation collar 70. A rotator mechanism 72 permits the rotation of mud gun 80 within rotation collar 70. The rotator mechanism 72 contains a plurality of slots 74 which are sized to engage one or more teeth 76 mounted on the external surface of mud gun 80. Once tooth 76 has been engaged in slot 74, mud gun 80 may be rotated by using control arm 78, thus moving the position of mud gun outlet 82. Through the use of control arm 78, the mud gun outlet 82 may be rotated through 360°, allowing the mud gun 80 to stir up sediments in any portion of the compartment.

Figure 5:
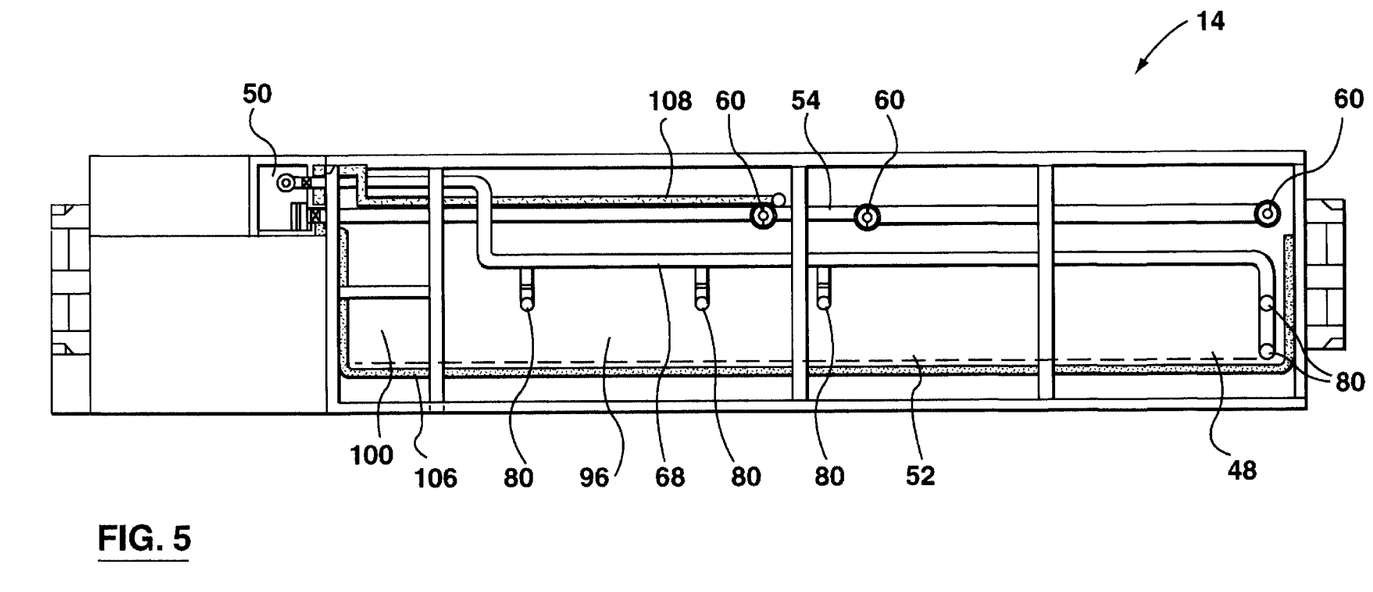
FIG. 5 is a top plan view of the separator.

Referring now to FIG. 5, a top plan view of the preferred embodiment of the apparatus, the circulation pump 50 is connected to the suction line 54 with its associated intake valves 60 and to the discharge line 68 with its associated mud guns 80. A steam line 106 extends through the compartments of the separator 14 and may be activated in cold weather operations to prevent the fluid in the separator from freezing. A steam manifold 108 may be connected to an external steam line to provide a source of steam.

Figure 6:
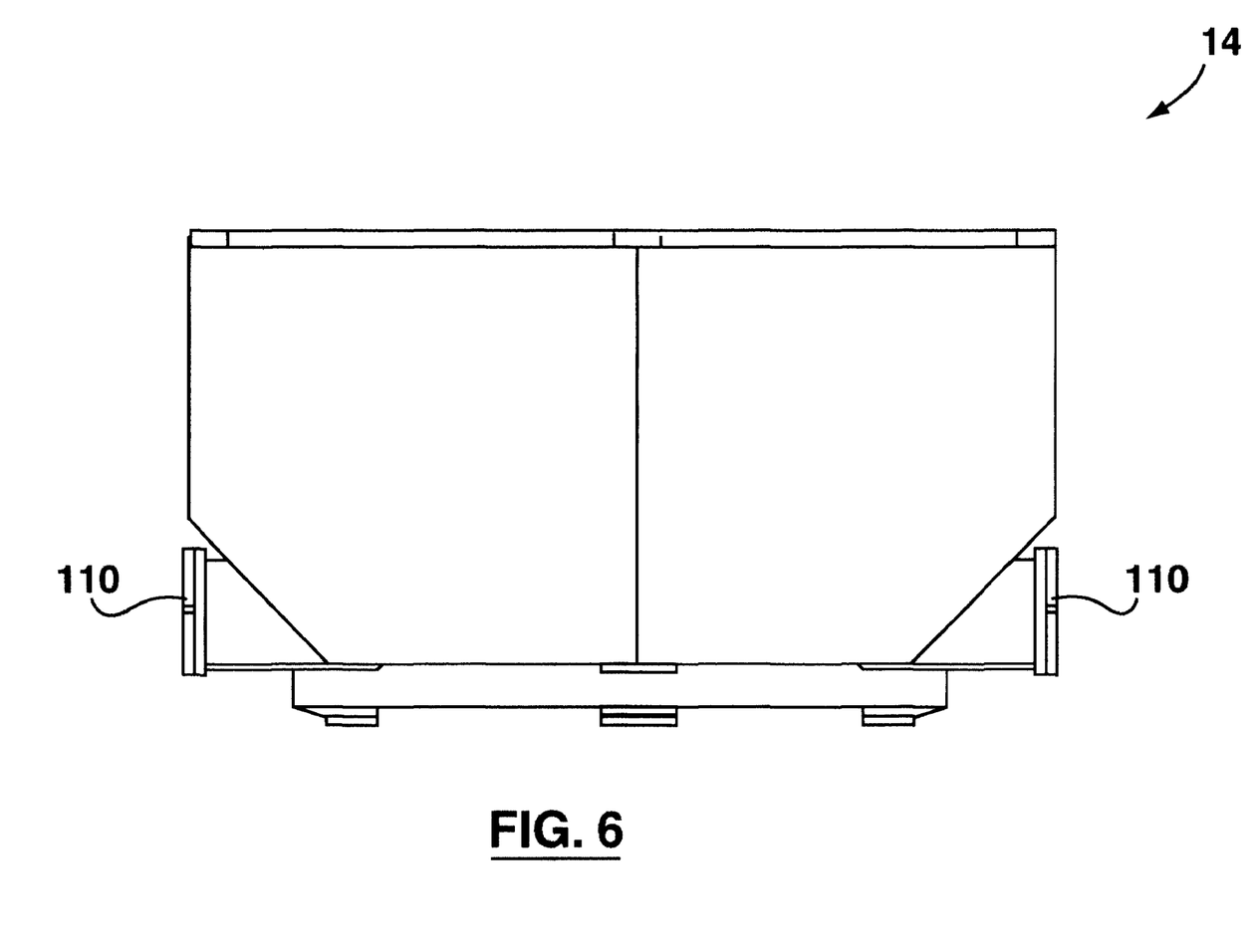
FIG. 6 is an end view of the separator.

Referring now to FIG. 6, an end view of the preferred embodiment of the apparatus, dump gates 110 are illustrated. A dump gate 110 is located at the base of each compartment. The dump gate 110 allows the operator to flush or scrape out any sediments remaining in the compartments after the separator 14 has been drained.

Referring now to FIG. 7, there is shown a perspective view of a mechanism to aid in the alignment of the degasser 40 with the blooie line 12. A degasser alignment mechanism 116 comprises a fixed alignment support 118, a slidable alignment support 120, an alignment screw 122, an alignment handle 124 and an alignment base 126. The fixed alignment support 118 is securely attached to the main body of the separator 14 by welding or the like to ensure it remains immobile. The fixed and slidable alignment supports 118, 120 have abutting sliding surfaces, which preferably are maintained lubricated. The slidable alignment support 120 is in the form of a cradle to support the degasser input line 39. The slidable alignment support 120 is securely attached by welding to the exterior wall of the degasser input line 39, proximate the degasser connector 38. An alignment screw 122 adjustably connects the fixed alignment support 118 to the slidable alignment support 120. Rotation of an alignment handle 124 in a clockwise or counter clockwise direction rotates the alignment screw 122 and causes the slidable alignment support 120 to move laterally away from or toward the fixed alignment support 118 along an alignment base 126. The alignment base 126 has attached to each end of its upper surface, an alignment stop 128. The alignment stops 128 ensure that the slidable alignment support 120 does not move beyond a desired range of adjustment. Attached to the slidable alignment support 120 is a locking plate 130. The locking plate 130 has a locking channel 132 which also serves to limit the lateral movement of the slidable alignment support 120 along the alignment base 126. Positioned within the locking channel 132 is a locking bolt 134 which is connected to the alignment base 126. Once the degasser connector 38 is aligned with the blooie line 12, the locking bolt 134 is tightened to secure the position of the degasser input line 39.

As can be appreciated by one skilled in the art, the ability to laterally adjust the degasser input line 39 to mate with the degasser connector 38 is a preferred solution to moving the entire separator 14 in an attempt to provide a connection.

Referring now to FIG. 8, a perspective view of a posterior alignment mechanism designed to function in cooperation with the alignment mechanism of FIG. 7, the posterior alignment mechanism 136 is shown. The posterior alignment mechanism 136 is of similar construction to the degasser alignment mechanism 116. The posterior alignment mechanism 136 serves to cooperate with the degasser alignment mechanism 116 in that it allows for the lateral movement of the degasser 40 of required. The structure of alignment mechanism 116 is similar to that of posterior alignment mechanism 136 and a description of the like numbered components may be found in the description of FIG. 7 above. The posterior alignment mechanism 136 has as its slidable alignment support 120, a pair of flanges welded to the exterior of a pair of drop tubes 46.

As can be appreciated, the alignment mechanisms 116, 136 may cooperate to provide a slight angular movement, thus allowing the line 12 to enter the degasser 40 at an angle not parallel to the vertical walls of the separator 40.

Figure 9:
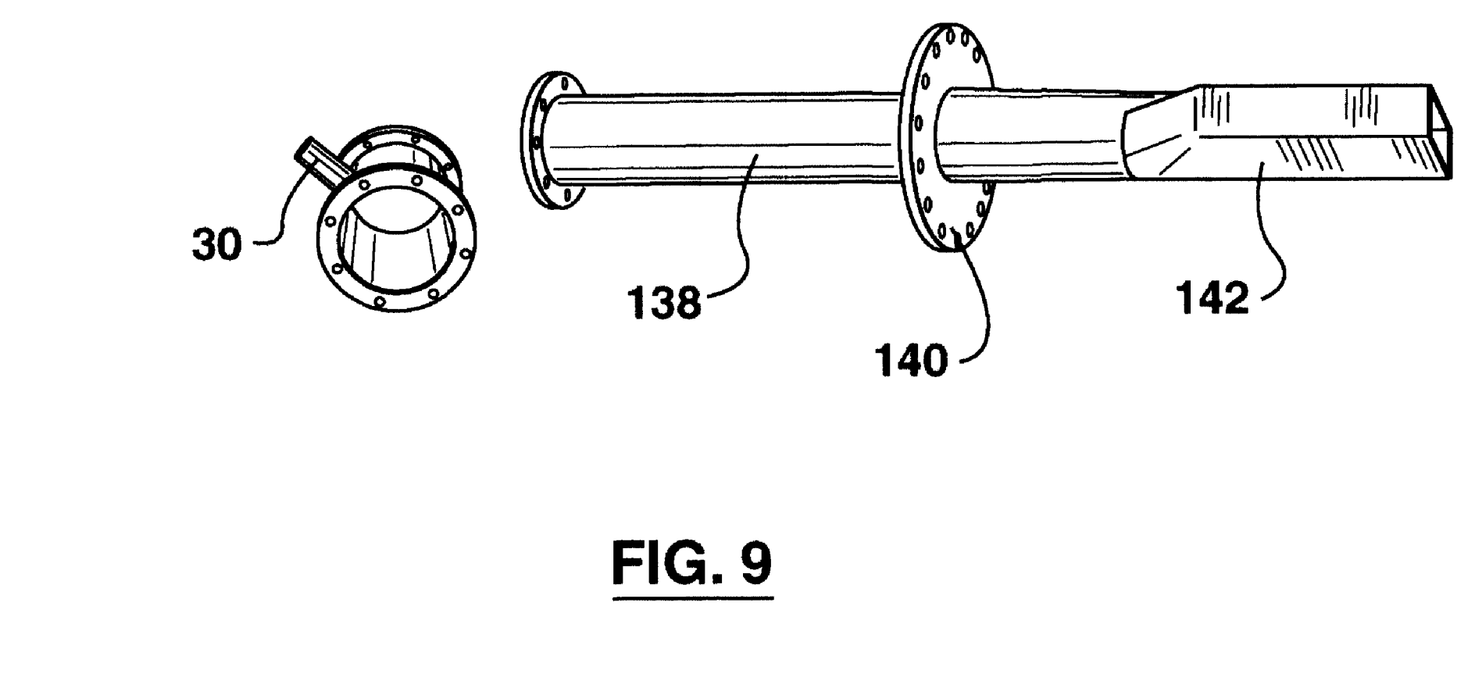
FIG. 9 is a perspective view of an adaptor used to connect the line from the well bore to the separator.

Referring now to FIG. 9, there is shown a perspective view of an adapter used to connect the line from the well bore to the separator. As discussed above, with regard to FIG. 1, the dead head 19 in its standard configuration has an inlet 8 inches in diameter and an outlet 16 inches in diameter. The degasser connector 38 is sixteen inches in diameter. In some drilling situations, for example when using foam, it may be beneficial to eliminate the dead head 19 entirely or alternatively provide for an outlet diameter of 8 inches from the dead head, i.e. with no change in diameter. The use of an 8 inch pipe and no dead head allows the foam to flow at a relatively high velocity, which aids the degasser 40 in breaking down the foam. As the degasser connector 38 receives a connection sixteen inches in diameter, the degasser adaptor 138 is required for such situations. The degasser adaptor 138 has an adaptor flange 140 sized to mate with the degasser connector 38. When the adaptor flange 140 and degasser connector 38 are mated, the degasser insert 142 is contained within the walls of degasser input line 39. Thus, just prior to entry into the degasser 40, the flow from the well bore 20 is contained within the degasser adapter 138. This avoids any abrupt change in the flow cross-section.

In use, the separator 14 operates as follows: the blooie line 12 connects the separator 14 to the drilling rig shown generally as 16. The drilling rig 16 comprises a rotatable drill string 18 which extends into the well bore 20. At the end of the drill string 18 in the well bore 20 is mounted a drill bit 24. As the drill string 18 rotates, the drill bit 24 cuts into the ground. Drilling fluid 26 is pumped through the drill string 18 to cool drill bit 24 and to flush cuttings to the surface and out of the bottom of the drill bit 24. The drilling fluid 26 then returns to the surface of the drilling rig through the annular space 22 between the drill string 18 and the well bore 20. The drilling fluid 26 then exits the drilling rig 16 through the blooie line 12 toward the separator 14. Water or steam is injected into the drilling fluid 26 at intake line 30. This serves to mix water with dust or other cuttings to aid in dedusting. The drilling fluid 26 then contacts impact plates 28 which serve to slow down its velocity. After contacting the impact plates 28, the now slower moving drilling fluid 26 drops to a chamber below the impact plates 28 and proceeds along the blooie line 12 toward the separator 14. Corresponding to these different velocities, the blooie line upstream and downstream from the impact plates has different diameters; for example, in air drilling, the diameter is 8" upstream while the diameter is 16" downstream. In the case of foam drilling, the impact plates may be eliminated and a single 8 inch line to the separator may be utilized. This smaller diameter line keeps the foam at a high velocity which makes it easier for the separator to break it down.

Flow into the blooie line 12 may be reduced by injecting water into intake line 30, and this also serves to wet dust in the air flow for pure air drilling. For example, if 5,000 litres per minute are injected through intake line 30, then the air flow upstream of intake line 30 has to impart momentum to the injected water, which in turn creates back pressure. This back pressure is exerted upon the well, which in turn limits the flow from the well and allows the pressure on the oil reservoir to be controlled without restricting flow from the well. The injection of water also makes the drilling fluid 26 more dense and more liquid to aid in separation of the air, gas, foam, solids from the liquid.

The blooie line 12 also contains the additional intake ports 32, 34, and 36. Intake port 32 is a water injection connection similar to intake line 30, to enable injection of water to kill dust cuttings, dilute foam and reduce the velocity or momentum of the flow in the blooie line 12. The port 34 is a bypass connection, when a drill pipe connection is made while drilling, air flow which would normally go down the well bore, is diverted into this port or intake 34. This diverts air flow away from the drill pipe and allows the drilling rig crew to safely make a connection to a new pipe, and it also maintains a uniform flow through the blooie line 12, downstream from this connection. Intake port 36 is a high volume water injection point which serves to further kill dust cuttings, dilute foam and reduce momentum if required.

These connections were also originally intended for breaking down foam, but it is now preferred to provide a second deduster unit in addition to the one shown at 30, for foam applications.

The drilling fluid 26, having passed through the blooie line 12, next enters the degasser 40. The degasser 40, a Vortex Cluster manufactured by Porta-Test International Inc., separates the gases in the drilling fluid 26 from the solids and liquids. The gases are vented out to a flare pit or flare stack (not shown) through a flare pit exit 42 where they are burned. The solids and liquids then flow down the set of drop tubes 46 and fall to the bottom of the first compartment 48. The liquid level in the first compartment 48 is maintained high enough to prevent flow of gas down through the drop tubes 46.

The liquid in separator 14 is circulated through the separator 14 by the circulation pump 50. The circulation pump 50 may extract liquid from the bottom of any or all of the first, second or third compartments (48, 52, 96) via the suction line 54 and associated intake valves 60. In standard use, suction line 54 will extract fluid solely from the third compartment 96. The operator may, however, choose to open or close any of the intake valves 60 by utilizing intake valve control arm 62 (FIG. 3). The liquid is circulated through circulation pump 50 and expelled via discharge line 68 to mud guns 80. Mud guns 80 serve to stir up sediment at the base of individual compartments within the tank. The operator may control the flow of liquid through a mud gun 80 by opening or closing mud gun control valve 84. In addition to opening or closing the control valves 84, the operator may rotate each mud gun 80 by using the control arm 78 (FIG. 4).

The liquid and sediments at the base of the first compartment 48 are pumped to the conventional shale shaker 86 through shale shaker input line 87 by the shale shaker pump 90. The shale shaker 86 screens out the larger solids and jettisons them to a shale tank (not shown) exterior to the separator 14. Typically, this is a tank, which can be a three sided tank, butted against the side of the separator 14 for collecting the shale. In the preferred embodiment, the liquid exiting through the shale shaker 86, is returned to the second compartment 52. The liquid may, however, be routed to any of the other compartments (48, 96) compartments via a hose connection (not shown) from the shale shaker 86.

The liquid is pumped by an external pump (not shown) through centrifuge input line 97, from the second compartment 52 to the centrifuge 98. The centrifuge 98 separates the finer solids from the liquid and deposits the solids in the shale tank (not shown). The centrifuge 98 also helps to break up any foam in the liquid mixture. Associated with the centrifuge is a flocculant pump 102 which may add chemicals such as polymers to the liquid to promote flocculation of the particles in the liquid, diluted flocculent being pumped from the fourth compartment 100 via flocculent line 103. The liquid is then returned from the centrifuge 98 to the third compartment 96. The liquid may, however, be routed to any of the other compartments (48, 52) via a hose connection (not shown). Once the liquid reaches the third compartment 96 it is pumped out to be re-used in the drilling process, stored in a tank or deposited at the site if it meets environmental guidelines. A portable submersible pump (not shown) can be provided in the third compartment 96 to pump out the relatively clean water.

A steam line 106 runs through the compartments of the tank and may be activated in cold weather operations to prevent the liquid in the tank from freezing. A steam manifold 108 is connected to the steam line to provide an external source of steam.

When use of the separator 14 at a particular site is finished, or in the event that enough sediment has accumulated to impede proper filtration, the various pumps are turned off. The unit is then drained, by way of external dump gates 110 located near the base of each compartment and the sediment removed via the dump gates 110.

It is noted that the present invention will handle:

(a) foam drilling;

(b) air rated fluids;

(c) dust drilling;

(d) nitrified flows;

(e) sweet gas (i.e. no H2S);

(f) under balanced operations;

(g) mist drilling; and (h) environmental fluids and solids clean ups.

Although the preferred embodiment comprises four compartments (48, 52, 96, 100), a degasser 40, and a shale shaker 86, additional compartments, shale shakers, centrifuges and degassers, may be added to handle large flow volumes.

In an alternative embodiment, the separator 14 may be sized to fit within a frame dimensioned to the standard shipping container. This would allow for simple shipping and deployment in offshore use. For offshore use an alternative drilling fluid would be a combination of diesel fuel and brine water. This could conceivably be aerated with nitrogen, to lighten the fluid column.

In an alternative use, the separator 14 may be utilized in a mining application. For example, in the cleaning up of tailings from gold mine operations. The large solids from the tailings would be separated by the shale shaker and the centrifuge would be set to separate out from the tailings any residual gold dust.

We claim:

1. A separator, for separating a flow of material from a blooie line exiting from a well bore, the separator comprising:

a first compartment for receiving liquid; and a centrifugal means for imparting centrifugal forces to the flow of material to promote separation of gases from liquids and solids, said centrifugal means comprising: an inlet for connection to the blooie line in use; an upper housing; a tube extending generally vertically down from the upper housing; a first outlet for gas and provided in the upper housing; a second outlet for liquids and solids and provided at the lower end of the vertical tube, the second outlet discharging into the first compartment, wherein the vertical tube extends down into the compartment so that, in use, a liquid level can be maintained in the first compartment that prevents flow of gas down through the second outlet, whereby the flow of material, including gas, liquids and solids, enters the centrifugal means through the inlet and is subject to centrifugal forces, causing the gas to be separated from the liquids and solids, the gas exiting through the first outlet, and the liquids and solids only exiting through the second outlet to the first compartment, for separation.

2. A separator as claimed in claim 1, which includes a plurality of generally vertical tubes, the vertical tubes having lower ends disposed within the first compartment and providing the second outlet, the lower ends of all of the vertical tubes extending down into the first compartment so that, in use, a liquid level can be maintained preventing gas passing down through the lower ends of the tubes.

3. A separator as claimed in claim 2, wherein the vertical tubes are provided in two rows, with an equal number of tubes in the two rows, on either side of an inlet line, the inlet line extending between the rows and being provided with a first inlet and being such as to divide the flow from the first inlet substantially equally between the tubes.

4. A separator as claimed in claim 3, which includes a plurality of compartments for liquid.

5. A separator, for separating a flow of material from a blooie line exiting from a well bore, the separator comprising:

a plurality of compartments comprising a first compartment, and at least one other compartment;

a first pump connected to the first compartment, for pumping liquid and entrained solids from the first compartment;

a solid separation device for separating larger solid particles from the liquid, wherein the outlet of the first pump is connected to discharge water and solids to the solid separation device, and wherein the solid separation device discharges water into said at least one other compartment and solids away from the compartments;

a centrifugal means for imparting centrifugal forces to the flow of material to promote separation of gases from liquids and solids, said centrifugal means comprising: an inlet for connection to the blooie line in use; an upper housing; a tube extending generally vertically down from the upper housing; a first outlet for gas and provided in the upper housing; a second outlet for liquids and solids and provided at the lower end of the vertical tube, the second outlet discharging into the first compartment, wherein the vertical tube extends down into the compartment so that, in use, a liquid level can be maintained in the first compartment that prevents flow of gas down through the second outlet, whereby the flow of material, including gas, liquids and solids, enters the centrifugal means through the inlet and is subject to centrifugal forces, causing the gas to be separated from the liquids and solids, the gas exiting through the first outlet, and the liquids and solids only exiting through the second outlet to the first compartment, for separation.

6. A separator as claimed in claim 5, which includes a plurality of generally vertical tubes, the vertical tubes having lower ends disposed within the first compartment and providing the second outlet, the lower ends of all of the vertical tubes extending down into the first compartment so that, in use, a liquid level can be maintained preventing gas passing down through the lower ends of the tubes.

7. A separator as claimed in claim 6, wherein the vertical tubes are provided in two rows, with an equal number of tubes in the two rows, on either side of an inlet line, the inlet line extending between the rows and being provided with a first inlet and being such as to divide the flow from the first inlet substantially equally between the tubes.

8. A separator as claimed in claim 5, which includes a centrifuge, and second pump means for pumping liquid containing fine solids from said at least one other compartment, the second pump means being connected to the centrifuge, wherein the centrifuge discharges water to one of the compartments and fine solids away from the compartments.

9. A separator as claimed in claim 8, wherein the solid separation device comprises at least one shale shaker and wherein the centrifuge comprises at least one decanter centrifuge including an auger for removing fine solids therefrom.

10. A separator as claimed in claim 9, which includes second and third compartments, a circulation pump, and a suction line for the circulation pump connected to the circulation pump and having an inlet in each of the first, second and third compartments, a valve means for opening and closing each inlet, a discharge line connected to the circulation pump and at least one mud gun in each of the first, second and third compartments, connected to the discharge line, whereby the circulation pump withdraws liquid from one or more of the compartments and discharges the liquid through selected mud guns, to effect the circulation of solids within the compartments.

11. A separator as claimed in claim 5, 8 or 9, which includes at least one additional tank, for preparation of a flocculant mixture, whereby in use, flocculant can be added to flow to the centrifuge, to promote flocculation of fine solids and separation thereof from the liquid.

12. A separator as claimed in claim 3, wherein the separator includes a main separator body defining the first compartment and, on either side of the centrifugal means, an alignment base mounted on the body above the first compartment, and an alignment support attached to the centrifugal means as an alignment pair, the alignment support and the alignment base of each alignment pair including abutting and slidable support surfaces to support the centrifugal means and to permit limited adjustment of the centrifugal means relative to the first compartment laterally and angularly, thereby to facilitate alignment of the inlet of the centrifugal means with the blooie line, and wherein alignment adjustment means are provided for each alignment pair.

13. A separator as claimed in claim 8, which is mounted on a skid for transportation.

14. A separator as claimed in claim 2 in combination with a blooie line, wherein the blooie line is connected to the inlet of the centrifugal means.

15. A separator as claimed in claim 14, wherein the blooie line includes a dead head, for absorbing the momentum of solid particles.

16. A separator as claimed in claim 15, wherein the blooie line includes a first portion of a first diameter upstream of the dead head and a second portion of a second, large diameter downstream from the dead head.

17. A separator as claimed in claim 15, which includes a deduster upstream of the dead head and which has a connection port for connection to a water supply, for spraying water into the material flow to wet solids therein.

18. A separator as claimed in claim 15, 16, or 17 wherein the blooie line includes additional ports for injection of water for at least one of: injecting a high volume of water to kill dust cuttings; diluting foam and reducing the velocity of flow in the blooie line; and providing a bypass connection.

19. A method of separating a material flow from a blooie line connected to a well head, the method comprising the steps of:

(1) passing the material flow into a centrifugal means whereby centrifugal forces effect separation of gas from liquids and solids;
(2) causing gases to exit through a first port from the centrifugal means;
(3) causing liquids and entrained solids to exit from a second port from the centrifugal means; and
(4) separately effecting separation of the liquid from the solids.

20. A method as claimed in claim 19, which includes: locating the second port in a compartment filled with liquid and maintaining the second port below the level of the liquid in the compartment.

21. A method as claimed in claim 20, which includes passing the material flow through a centrifugal means including a tube disposed generally vertically, wherein gases exit through the first port above the vertical tube and liquids and solids exit from a lower end of the vertical tube, providing the second port.

22. A method as claimed in claim 21, which comprises passing the material flow through a plurality of generally vertical tubes to effect separation of gases from liquids and solids, the lower ends of the vertical tubes providing the second port, and locating the lower ends of all of the tubes below of the liquid in the compartment.

23. A method as claimed in claim 22, which comprises supplying the material flow through a common inlet to the vertical tubes and dividing the material flow substantially equally between the vertical tubes.

24. A method of separating a material flow from a blooie line connected to a well head, the method comprising the steps of:

(1) passing the material flow into a centrifugal means whereby centrifugal forces effect separation of gas from liquids and solids;
(2) causing gases to exit through a first port from the centrifugal means;
(3) causing liquids and entrained solids to exit from a second port from the centrifugal means;
(4) locating the second port in a compartment filled with liquid and maintaining the second port below the level of the liquid in the compartment; and
(5) separately effecting separation of the liquid form the solids;

wherein the method includes: causing liquids and solids exiting from the second port to flow into a first compartment; and withdrawing liquids and entrained solids from the first compartment and passing the liquids and entrained solids through a solids separation device, to separate larger solid particles from the liquids, and which further comprises discharging the liquids from the solid separation device into a second compartment and discharging the solids separately.

25. A method as claimed in claim 24, which includes passing the material flow through a centrifugal means including a tube disposed generally vertically, wherein gases exit through the first port above the vertical tube and liquids and solids exit from a lower end of the vertical tube, providing the second port.

26. A method as claimed in claim 25, which comprises passing the material flow through a plurality of generally vertical tubes to effect separation of gases from liquids and solids, the lower ends of the vertical tubes providing the second port.

27. A method as claimed in claim 26, which comprises supplying the material flow through a common inlet to the vertical tubes and dividing the material flow substantially equally between the vertical tubes.

28. A method as claimed in claim 24, which includes withdrawing liquids containing fine solids from the second compartment and passing the liquids through a centrifuge to remove the fine solids, and which further comprises discharging liquids from the centrifuge into a compartment and discharging fine solids from the centrifuge separately.

29. A method as claimed in claim 28, which includes adding flocculant to liquid flowing to the centrifuge, to promote flocculation of fine solids.

30. A method as claimed in claim 24, which includes supplying the material flow to the centrifugal means through a blooie line.

31. A method as claimed in claim 30, which includes providing a dead head in the blooie line and permitting the material flow to impact the dead head to absorb momentum of solid material.

32. A method as claimed in claim 31, which includes providing a blooie line with a first portion upstream of the dead head of relatively small diameter and a second portion downstream from the dead head and connected to the centrifugal means of relatively large diameter and passing the material flow through the blooie line, whereby the dead head absorbs momentum of the material flow and the material flow has a lower velocity downstream from the dead head.

33. A method as claimed in claim 30, 31 or 32, which includes adding water upstream of the dead head to the material flow, to promote wetting of solids and separation thereof in the centrifugal means.

34. A method as claimed in claim 31, wherein the material flow includes foam and solids, and wherein the method comprises providing substantial flow of water in to the blooie line, to increase the density of the foam, thereby promoting breakdown of the foam in the centrifugal means.

\* \* \* \* \*